EPITAXIAL GROWTH THROUGH A SILICON DIOXIDE MASK IN A VACUUM VAPOR DEPOSITION PROCESS

Filed Dec. 11, 1961 2 Sheets-Sheet 1

ARTHUR P. HALE
BRIAN D. JAMES
INVENTORS

BY

Lippincott, Ralls & Hendricson
ATTORNEYS

ARTHUR P. HALE
BRIAN D. JAMES
INVENTORS

BY

Lippincott, Ralls & Hendricson
ATTORNEYS

United States Patent Office 3,156,591
Patented Nov. 10, 1964

3,156,591

EPITAXIAL GROWTH THROUGH A SILICON DIOXIDE MASK IN A VACUUM VAPOR DEPOSITION PROCESS

Arthur P. Hale, Santa Clara, and Brian D. James, Menlo Park, Calif., assignors to Fairchild Camera and Instrument Corporation, Syosset, N.Y., a corporation of Delaware Filed Dec. 11, 1961, Ser. No. 158,298
5 Claims. (Cl. 148—175)

The present invention relates to an improved process for the epitaxial growth of semiconducting materials.

It is known in the art to grow additional material upon a monocrystalline wafer of a semiconductor to thereby extend the monocrystalline structure by epitaxial growth. This invention provides an improvement in epitaxial growth processes through the utilization of an integral protective coating upon the wafer being operated upon. Although the utilization of masks in vapor deposition is known, the present process produces a precise definition of the extent of growth with an adherent mask while at the same time preventing deposition upon the mask. Although it may be initially considered that vapor deposition or evaporation of materials in epitaxial growth processes will result in the unavoidable depositing of such materials upon any masking or the like employed to control same, the present process provides for the elimination of such undesirable depositions. This is highly advantageous in that the semiconducting material deposited in accordance herewith does thus not overlie masking employed herein, but instead deposits only upon exposed areas of the underlying semiconducting material.

The process of this invention provides controlled temperature conditions for the deposition of material upon a semiconducting wafer or the like to thereby form an epitaxial growth of like single crystal structure upon such a wafer. The resultant raised portions of the wafer are monocrystalline with the original wafer and may if desired have a different impurity concentration than the wafer or an entirely different polarity, through the inclusion of an alternative type of impurity in the grown portion of the resultant structure. The present invention thus finds wide applicability in the manufacture of semiconducting devices such as transistors as well as in the field of solid-state circuitry.

The method of the present invention is described below in reference to the accompanying drawing, wherein:

FIGURE 1 schematically illustrates at portions A through D thereof separate steps in the method of the present invention;

The present invention, in brief, comprises the steps of applying an adherent protective coating upon a wafer of semiconducting material. In the instance wherein a silicon semiconductor is employed, the coating is formed by oxidation of the surface to form silicon dioxide. This coating is employed as a mask and openings are formed therethrough to expose limited areas of the semiconductor for epitaxial growth of additional semiconducting material thereon.

Following the foregoing steps of applying the coating and forming openings therein, the semiconducting material or substrate, as it may be termed, is raised to an elevated temperature. The temperature of the substrate is maintained at least sufficient for epitaxial growth. In the case of silicon semiconducting material having a silicon dioxide mask thereon, the substrate is also raised to a temperature in excess of the vaporization temperature of silicon monoxide. Silicon is then evaporated and deposited upon the exposed surface of the substrate through the openings in the mask. Although it might appear that such silicon would also be deposited upon the mask, maintenance of the substrate and mask at the above-noted temperature results in the formation of volatile silicon monoxide. Consequently, the excess silicon, otherwise depositing upon the mask, instead forms the compound SiO which volatilizes and dissipates. Note further in this respect that the maintenance of this temperature prevents condensation of the silicon monoxide upon the substrate or masking. The process of this invention may be carried out to the extent of entirely volatilizing and thus removing the mask from the substrate. Molecular deposition of semiconducting material upon the exposed surface of a substrate produces an epitaxial growth thereon under the conditions wherein the substrate is maintained at a temperature in excess of that required for epitaxial growth. With continuation of the process to completely remove the masking, there is then produced a mesa configuration, wherein the resultant material has a raised portion thereon of a lateral extent as limited by the dimension of the original opening in the mask and the entire structure is monocrystalline.

Figure 1:
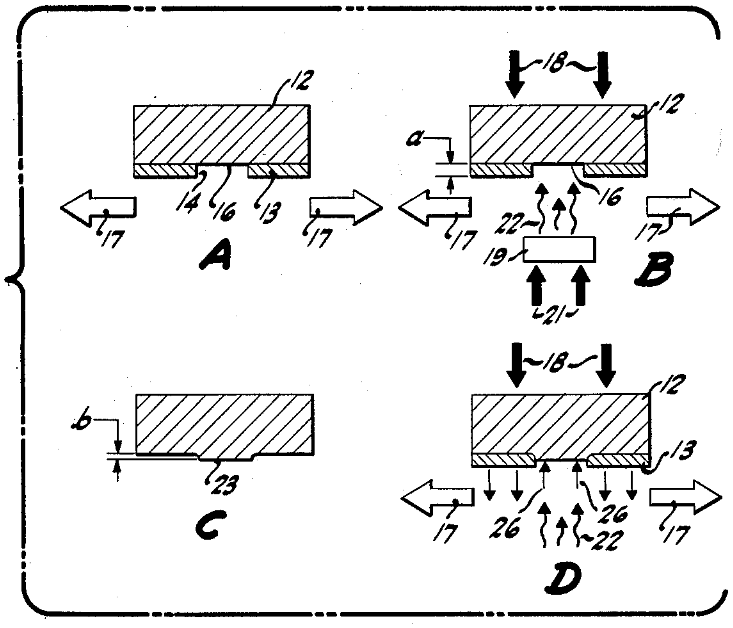

Considering now the steps of the process hereof in somewhat greater detail, as referred to a preferred manner of carrying out the invention, reference is first made to FIGURE 1 illustrating successive steps in the vacuum deposition of silicon upon a wafer for epitaxial growth thereof. As shown in FIGURE 1A, there is initially provided a monocrystalline silicon wafer 12 having a silicon dioxide coating 13 thereon. An opening or hole 14 is formed in this coating 13, as by conventional techniques known in the art, to thereby expose a limited surface 16 of the wafer. It is upon this surface 16 that epitaxial growth is carried out in accordance herewith. Vacuum deposition is accomplished in a suitable enclosure, as discussed below, and the evacuation is indicated in FIGURE 1A by block arrows 17.

The wafer 12 is heated, as indicated by the block arrows 18, to thereby raise this wafer to a temperature sufficient for epitaxial growth of silicon upon the surface 16 thereof. Within the evacuated volume there is provided a source of silicon 19 which is heated, as indicated by the block arrows 21. Application of sufficient heat produces an evaporation of silicon so that atoms or molecules of silicon rise toward the wafer, as indicated at 22. It is only necessary to apply an adequate amount of heat to the source 19 to establish a desired evaporation rate at the reduced pressure thereabout.

The wafer 12 is maintained at least at the minimum temperature for epitaxial growth of silicon thereon, and the growth may contain acceptor or donor impurities to establish rectifying junctions in the resultant structure. Removal of the coating 13 produces a semiconductor wafer having a mesa 23 thereon, as shown at FIGURE 1C.

The process hereof prevents the deposit of silicon upon the masking through the generation of volatile SiO and the process may be continued to the point where the masking is entirely volatilized. Referring to FIGURE 1D, the same silicon wafer 12 is illustrated as having a coating of silicon dioxide 13 thereon with heat being applied as indicated at 18 to maintain the wafer and coating at an adequate temperature for epitaxial growth of silicon upon the surface 16 thereof. With the generation of free silicon, as indicated by the arrows 22, there is produced, as noted above, an epitaxial growth of silicon upon the wafer in the opening defined by the mask. This excess of free silicon also serves to convert the silicon dioxide to volatile silicon monoxide which then flows as a vapor away from the mask, as indicated by the small arrows directed away from such mask in FIGURE 1D. Careful experimentation and measurement has shown that the rate of dispersion or removal of the mask during epitaxial growth is about twice the rate of growth of silicon upon the wafer. Consequently, with an initial mask thickness $a$, as indicated in FIGURE 1B, there will be produced a mesa 23 having a thickness $b$ upon complete dispersion of the mask with $b \cong a/2$.

The advantages of epitaxial growth and the configurations possible therewith, as well as the rather obvious advantages of mesa configurations and the like, are believed sufficiently well known in the art that no further comment thereon is included herein. It it, however, particularly noted that the present invention provides for the precise limitation of the extent of epitaxial growth while at the same time preventing the deposition of semiconducting material upon the masking employed to accomplish this definition. It is possible in accordance herewith to entirely remove the mask during epitaxial growth, although this is not necessary, and for certain semiconducting devices it is advantageous to originally employ a sufficiently thick mask that at least some portion thereof remains after completion of epitaxial growth.

Figure 2:
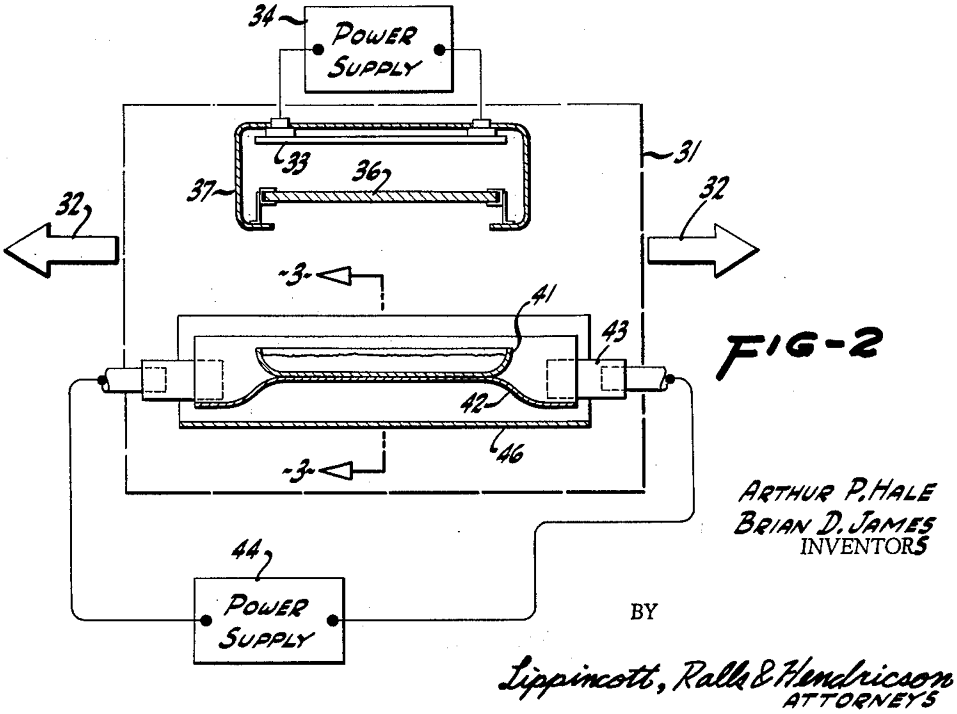
FIGURES 2 and 3 illustrate apparatus suitable for carrying out the process of this invention.
Figure 3:
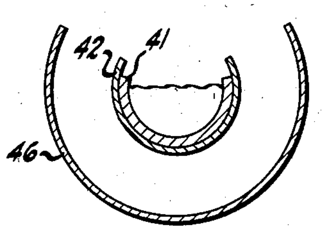

The process of the present invention has been carried out with the apparatus schematically illustrated in FIGURE 2, and it is with reference to this apparatus that the following examples are set forth. As shown in FIGURE 2 there is provided a container 31 which is continuously evacuated, as indicated by the block arrows 32. The container 31 comprises an 18-inch pyrex bell with a liquid nitrogen trap, and evacuation of this enclosure was accomplished by a diffusion pump and fore pump having a pumping speed of 300 liters per second. Within the enclosure there is provided a molybdenum wire heater 33 energized by a suitable power supply 34 disposed exteriorly of the enclosure. This heater is separated from a silicon wafer 36 by a distance of about 3 millimeters. The wafer is mounted within a holder and heat shield 37 by tantalum clips. The holder 37 has a dimension of 3 x 5 x 1 centimeters. Immediately below this holder 37 there is provided a source boat 41 which is formed of silica. A one mil tantalum foil 42 is wrapped about the source boat 41 and is fitted into the ends of molybdenum rods 43 which serve as electrical connectors to pass a heating current through the coil from an external power supply 44. A shield 46 is disposed tabout the boat to limit heat dissipation and to direct vapors upwardly therefrom. A cross-sectional view of this source boat together with heating foil and shield is illustrated in FIGURE 3.

Considering now an example of the process of the present invention as carried out with the apparatus described above and illustrated in FIGURE 2, there is first formed a conventional monocrystalline wafer of silicon, as illustrated at 36. In this instance, the wafer has a lower surface formed in the (111) plane and such surface is either etched or mechanically polished. The wafer is dipped in hydrofluoric acid and ultrasonically cleaned in order to minimize surface contamination. With the wafer mounted in the holder and shield 37, heat is applied to the wafer from the heater wire 33 to raise the temperature of the wafer to the minimum temperature for epitaxial growth of silicon thereon. In this example the wafer was raised to a temperature of 1125° C. The source 41 was raised to a temperature of about 1650° C., i.e., just below the softening point of the fused silica source boat. The source temperature in this example was limited by the source boat, and aside from this limitation high temperatures may be advantageously employed to attain greater rates of vaporization of silicon disposed within the source. The pressure within the enclosure 31 was maintained at $10^{-6}$ millimeters of mercury, and with a 2 centimeter distance between the source and holder the rate of deposition of silicon was measured to be about one half micron per minute. Epitaxial growth of silicon occurred upon the under surface of the wafer 36 and a 5 micron thick growth was formed in ten minutes in this example. Subsequent X-ray analysis of the wafer positively established that a single crystal structure was produced including the original wafer and the growth thereon.

Further to examples of the process of the present invention, there were produced epitaxial growths upon silicon wafers having silicon dioxide coating thereon with opening through such coating to expose limited areas of the wafer as a definition of the extent of the growth. These silicon oxide coatings were applied in conventional manner as described, for example, in published literature, and openings therein were formed by photoresist techniques and etching, as is also described in the literature. It is well known that available techniques provide for the attainment of extreme accuracy in the placement and physical dimensions of openings in silicon oxide masks upon silicon, so that a very precise control over the epitaxial growth was obtained. Vacuum deposition of silicon to form epitaxial growths upon a silicon wafer through openings in a mask were performed at a temperature of 1200° C. of the wafer. Here again the silicon source 41 was operated at maximum possible temperature for the source boat material, i.e., about 1650° C., to thereby attain the highest possible evaporation rate. Processing was carried out as described in the preceding example with the result that no silicon deposited upon the masking. Epitaxial growth of silicon was observed to occur in the openings in the mask and, furthermore, the depth or thickness of the mask was observed to decrease during processing. In this example processing was continued until the mask entirely disappeared. Analysis of the resultant wafer shower that the epitaxially grown mesa thereon had a thickness which was slightly less than one half of the thickness of the original silicon oxide masking upon the wafer. X-ray analysis of the resultant wafer verified the monocrystalline structure thereof.

In carrying out the process hereof in the manner described above, and with the apparatus illustrated in FIGURE 2, it was determined that silicon dioxide masking upon the wafer vaporized and was removed. This removal of the masking or coating apparently occurred through the production of silicon monoxide at the surface of the mask, and removal of same naturally occurs, inasmuch as silicon monoxide has a vapor pressure of 0.1 millimeter of mercury at a temperature of about 1100° C. Consequently, the silicon dioxide mask is continuously being removed during the epitaxial growth process hereof and the process may be terminated with some masking remaining, in order to protect rectifying junctions formed, for example, or the process may be continued to entirely remove the mask to produce the uncovered configuration of FIGURE 1C.

Variations in the process described immediately above were also carried out and it was found that at a wafer temperature of about 1000° C. the evaporated silicon continuously deposited upon the silicon dioxide as well as upon the silicon substrate in the mask openings. Operation of the process at temperatures in the range of 1000 to 1050° C. produced a brown film on the substrate, which was determined to be silicon monoxide rather than the desired epitaxial growth of silicon itself. Owing to the presence of silicon monoxide at temperatures sufficient to produce epitaxial growth, the process hereof is fully operable to attain the advantages of the invention at temperatures in excess of 1050° C.

Figure 4:
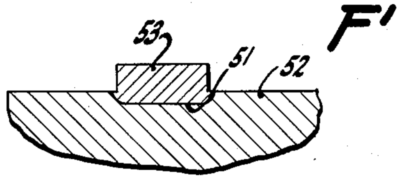
FIGURES 4 and 5 illustrate a partially completed semiconductor device formed in accordance with the present invention and having particularly illustrated rectifying junction configurations.

The process of the present invention is, as set forth above, also applicable to produce rectifying junctions during epitaxial growth. Acceptor or donor impurities may be incorporated in the epitaxially grown semiconducting material either by the inclusion of such impurities in the material prior to evaporation, or alternatively by the separate evaporation of these impurities so that the vapors commingle and the impurities are dispersed throughout the depositing semiconducting material. Many of the desirable acceptor and donor impurities employed in the doping of semiconducting materials have a much greater volatility than the materials themselves, and consequently, a certain loss of impurity level is encountered between the original source material and the epitaxially grown material. The process hereof also readily lends itself to the formation of rectifying junctions of desired and predeterminable configuration. Inasmuch as the present process is carried out at an elevated temperature in excess of the temperature required for epitaxial growth, there will occur a diffusion of acceptor and donor impurities during actual processing. This additional diffusion is herein employed to provide particular locations and configurations of rectifying junctions. In the instance wherein the substrate is heavily doped and the epitaxially grown material thereon is lightly doped, it will be appreciated that a diffusion of impurities from the substrate will occur into the epitaxially grown layer. This establishes a rectifying junction somewhere within the layer rather than within the substrate. Alternatively, the growth of a heavily doped material upon a relatively lightly doped substrate will produce a diffusion of impurities into the substrate, so as to depress the rectifying junction formed into the substrate itself. As an example of the foregoing, there was employed apparatus such as that illustrated in FIGURE 2, wherein the material within the source boat 41 comprised boron-doped silicon and the wafer 36 was formed of lightly doped N-type silicon formed in conventional manner by the prior dispersion of antimony in the material of the wafer. The process was carried out in a vacuum of the order of $10^{-5}$ millimeters of mercury with the wafer heated to a temperature of about 1150° C. and the source boat maintained at a temperature of the order of 1650° C. Silicon dioxide masking upon the under surface of the wafer 36 was provided with an opening therethrough, as described above, and there was produced an epitaxial growth of silicon upon the wafer at this exposed surface thereof, as defined by such masking. In this instance the wafer was formed of one ohm centimeter N-type silicon and the epitaxial growth was 0.2 ohm centimeter P-type silicon. There was produced by this processing a mesa configuration such as that illustrated in FIGURE 4, and the depth of diffusion was determined by fringe count when checked in a stained groove, according to known testing procedures. It will be seen from reference to FIGURE 4, that the rectifying junction 51 formed in this process extends into the substrate 52 from the mesa 53 epitaxially grown upon this substrate. While the entire growth process requires only a few minutes, the substrate temperature provides for diffusion of the impurity carried by or incorpoated in the epitaxial growth into the substrate under the condition wherein the epitaxially grown portion has a greater doping level than the substrate.

Figure 5:
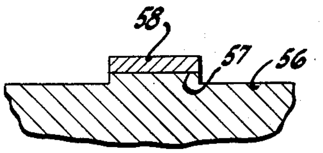

In the alternative circumstance wherein the substrate has a greater doping level than the deposited semiconducting material, there will result a diffusion of the substrate impurity into the epitaxially grown layer thereon. This is illustrated in FIGURE 5, wherein a heavily doped substrate 56 was processed in accordance with the present invention, as set forth above, to epitaxially grow an additional layer of monocrystalline semiconducting material thereon to form the indicated mesa 58. The epitaxial growth was produced by depositing one ohm centimeter P-type silicon upon 0.2 ohm centimeter N-type silicon. With a lightly-doped material being deposited upon a substrate, the impurity within the substrate diffused at process temperatures into this grown layer to thereby form a rectifying junction 57 above the original surface of the substrate and within the grown layer, as illustrated. An excess of donor or acceptor impurity is required to be employed in the deposition, inasmuch as not all of the evaporated impurity is diffused into the epitaxially grown layer. The doping level of the epitaxial growth is dependent upon the evaporation rate of the impurity, the rate of silicon evaporation, and the substrate temperature used.

Figure 6:
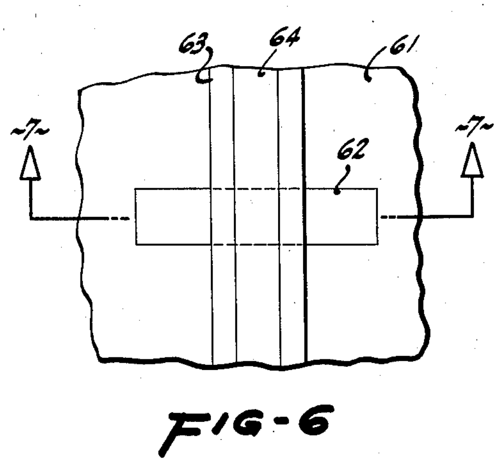
FIGURE 6 is a plan view of a portion of a solid-state circuit as may be formed in accordance with the process of this invention.
Figure 7:
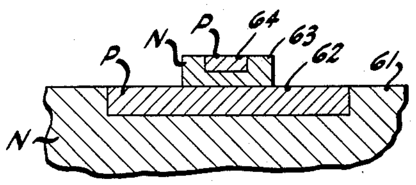
FIGURE 7 is a sectional view taken in the plane 7—7 of FIGURE 6 and illustrating particular lead-over-lead structure, as may be produced in accordance herewith.

In addition to the possible semiconductor device structures which may be produced with the process of this invention, there may also be advantageously produced solid-state circuit devices. The combination of more than one electronic device in a single solid-state unit poses various problems, among which is the difficulty of producing more than three distinct zones of different polarity by diffusion techniques. Particularly in the instance wherein the zones are to lie one within the other, very serious control problems are experienced in attempting to form this multiplicity of zones by diffusion techniques. The present invention overcomes certain difficulties in this field, inasmuch as separate zones may be formed in accordance herewith by epitaxial growth of appropriately doped semiconducting material. One problem encountered in the production of unitary semiconductor circuitry lies in the difficulty of forming electrical conductors or resistors which pass over one another. In accordance with the present invention, this structure may be readily accomplished by starting, for example, with an N-type substrate as illustrated at 61 in FIGURES 6 and 7. Into this substrate there may be diffused by conventional techniques a P-type zone 62 extending, for example, transversely across a portion of the substrate as indicated. Upon this substrate there is then epitaxially grown, in accordance with the process of the present invention, a mesa 63 having a donor impurity included therein so as to establish an N-type mesa. In the illustrated example this mesa 63 extends transversely across the P-type layer in the substrate. Following formation of this mesa 63, there is then diffused a small zone 64 longitudinally thereof by the diffusion of an acceptor impurity therein to produce the P-type zone 64, as illustrated. The diffusion techniques employed herein may be accomplished with known techniques. The resultant structure will be seen to provide an elongated P-type zone separated by back-to-back P-N junctions from the transversely extending P-type zone 62. There is, consequently, afforded a material electrical isolation between the zones 62 and 64, and consequently, these zones may be employed as relatively low resistance paths for the passage of current in a solid-state circuit. This lead-over-lead structure illustrated in part in FIGURE 7 is highly advantageous in the production of solid-state circuits, and the separate electrical paths through the zones 62 and 64 may, for example, extend between selected portions of semiconductor devices also formed in the single wafer or substrate 61.

There has been described above an improved process for producing epitaxial growth of semiconducting material. This process provides for very precisely limiting the area of deposit of semiconducting material employed in the epitaxial growth through the utilization of an apertured adherent coating upon the semiconductor. The present invention also provides for the volatilization of the masking in the particular atmosphere utilized in the process and does thus, consequently, prevent the deposition of semiconducting material upon the mask. There is also described above and in part illustrated certain physical structures which may be formed with the process of the present invention, however, one skilled in the art will readily perceive various other structures which may be advantageously produced in accordance with the process hereof. Although the present invention is set forth above in general terms together with specific examples of process operation, it is not intended to limit the present invention by the terminology of this description. Attention is instead invited to the appended claims for a precise delineation of the true scope of this invention.

What is claimed is:

1. An improved process of manufacturing semiconductor devices comprising the steps of forming upon at least one surface of a monocrystalline silicon wafer a sufficient coating of silicon dioxide to leave a coating of silicon dioxide on the surface at the end of the subsequent evaporation step, forming at least one opening in said silicon dioxide to expose a limited area of the surface of said silicon so as to define a mask upon such wafer surface, heating said silicon wafer in a high vacuum to a temperature in the range from about 1050° C. to the melting temperature of silicon, and evaporating silicon adjacent said wafer, whereby epitaxial growth occurs upon said exposed wafer surface in the mask opening and furthermore whereby a portion of said silicon dioxide coating is simultaneously reduced to volatile silicon monoxide, thereby preventing the deposition of a silicon film on the mask while leaving a final thinner coating of silicon dioxide on the surface at the end of the evaporation step.

2. A process as set forth in claim 1 further characterized by the step of dispersing an acceptor impurity throughout the evaporated silicon prior to such evaporation, whereby the epitaxial growth formed upon the silicon wafer at the area thereof exposed by said mask is a P-type silicon with predeterminable characteristics depending upon the amount of acceptor impurity included in the evaporated silicon.

3. A process as set forth in claim 1 further characterized by the step of separately evaporating a donor impurity simultaneously with the evaporation of silicon to thereby disperse a portion of such impurity throughout the evaporated silicon so that the epitaxial growth upon the silicon wafer is an N-type silicon.

4. An improved process of manufacturing semiconductors comprising the steps of forming a protective mask of silicon dioxide of sufficient thickness to leave a coating of silicon dioxide on the surface at the end of the subsequent evaporation step, upon a monocrystalline silicon semiconducting wafer having a predetermined impurity dispersed therein to define a first polarity thereof, said mask having at least one opening therein to expose a limited area of a surface of said wafer, heating said semiconducting wafer to at least the lowest temperature for the formation of epitaxial deposits thereon, continuously evacuating the volume adjacent said wafer and communicating with the exposed portions of the surface thereof to a pressure of about $10^{-5}$ millimeters of mercury or less, evaporating a silicon semiconducting material in said evacuated volume for vacuum deposition of such material upon the exposed portion of the wafer to produce a film thereon of the identical monocrystalline structure as that of the wafer and limited in lateral extent by said mask while simultaneously evaporating a portion of said mask, leaving a final thinner coating of silicon dioxide on the surface at the end of the evaporation step, and evaporating a selected impurity of the opposite type from that dispersed in the original wafer simultaneously wtih the evaporation of said semiconducting material to thereby disperse such evaporated impurity throughout the vapor deposited material for the formation of a P-N junction between the film and wafer, and predetermining the location of this P-N junction by control of the amount of evaporated impurity.

5. A process of manufacturing semiconductor devices of mesa configuration comprising the steps of forming a protective adherent mask of silicon dioxide of sufficient thickness upon the surface of a wafer or monocrystalline silicon semiconducting material to leave a coating of silicon dioxide on the surface at the end of the subsequent evaporation step, with at least one opening through the mask for defining the lateral extent of epitaxial growth upon the wafer surface, evacuating a volume encompassing the wafer, heating the wafer to a temperature in the range between the minimum temperature for epitaxial growth thereon and the softening temperature of silicon, depositing a source of the same semiconducting material as that of the wafter in proximity with the wafer and heating this source to evaporate semiconducting material therefrom, while simultaneously evaporating a portion of said mask, leaving a final thinner coating of silicon dioxide on the surface at the end of the evaporation step whereby the evaporated semiconducting material deposits upon said wafer in the openings provided in the masking thereon to form an epitaxial film having a lateral extent defined by the configuration of mask openings and does not deposit on the mask itself because of reactions of the material of the mask and the vaporized semiconducting material.

References Cited by the Examiner

UNITED STATES PATENTS

| | | | |
|---|---|---|---|
| 2,780,569 | 2/57 | Hewlett | 148—1.5 |
| 2,814,589 | 11/57 | Waltz | 117—130 X |
| 2,906,647 | 9/59 | Roschen | 148—1.5 |
| 3,031,270 | 4/62 | Rummel | 148—1.6 X |
| 3,064,167 | 11/62 | Hoerni | 148—33.5 |
| 3,098,774 | 7/63 | Mark | 148—175 |

OTHER REFERENCES

Aschner et al.: "A Double Diffused Silicon Transistor Produced by Oxide Masking Techniques," Journal of the Electrochemical Society, May 1959, pages 415–417.

DAVID L. RECK, *Primary Examiner.*

WINSTON A. DOUGLAS, HYLAND BIZOT, *Examiners.*